United States Patent [19]

Campanini

[11] 4,343,561
[45] Aug. 10, 1982

[54] SLACK ADJUSTER

[76] Inventor: Sergio Campanini, 224 E. Miller Rd., Iola, Kans. 66749

[21] Appl. No.: 203,745

[22] Filed: Nov. 3, 1980

[51] Int. Cl.$^3$ .......................... F16C 11/00; F16D 1/12; F16D 3/00
[52] U.S. Cl. ....................................... 403/97; 403/359; 403/288; 188/196 BA
[58] Field of Search ................ 403/97, 359, 331, 288; 188/196 R, 196 B, 196 BA, 79.5 R, 79.5 S

[56] References Cited

U.S. PATENT DOCUMENTS

| | | | |
|---|---|---|---|
| 3,245,271 | 4/1966 | Roberts | 403/359 X |
| 3,317,225 | 5/1967 | Cooper | 403/97 X |
| 4,019,708 | 4/1977 | Croup | 403/97 X |
| 4,186,905 | 2/1980 | Brudy | 403/97 X |

FOREIGN PATENT DOCUMENTS 508454 10/1920 France ................. 403/97

Primary Examiner—Wayne L. Shedd
Attorney, Agent, or Firm—Dowell & Dowell

[57] ABSTRACT

A slack adjuster assembly for coupling a brake shaft to a power actuator comprising a bushing member fixed to the brake shaft and having an annular flange therearound and having an annular bearing surface next to the flange which carries a series of teeth on a shoulder facing toward the bearing surface, a lever having a hub member journaled on the bearing surface and having a toothed shoulder interengaging with the teeth on the flange when the hub member is moved toward the shoulder, a spring urging the hub member toward the flange to keep the teeth normally engaged, and a pawl carried in one of said members and having lugs engageable with teeth of the opposite member to separate the teeth by compressing the spring and to advance the engagement of the teeth in a direction determined by the direction of rotation of the pawl.

8 Claims, 5 Drawing Figures

SLACK ADJUSTER

BACKGROUND & PRIOR ART

The present invention relates to slack adjusters of the type which comprise part of a lever used to connect a power actuator with the brake shaft of a vehicle braking system whereby linear motion of the actuator produces rotation of the brake shaft to apply the brakes. Slack adjustment is necessary because the clearance between the brake linings and the drum against which they are applied grows during wear of the linings and must be compensated. It is therefore common practice to build a slack adjuster into the lever assembly so that the rotational position of the brake shaft can be adjusted while maintaining the angular excursion of the lever substantially constant, since the motion of the actuator is limited.

A common type of slack adjuster comprises a bushing which is attached to the brake shaft, and an arm which has a hub member rotatable on the bushing, but has means for adjusting the angular position of the hub member with respect to the bushing carried by the brake shaft. One common expedient is to use a worm carried by the hub of the arm and engaging teeth around the periphery of the bushing, which comprises a worm wheel attached to the brake shaft so that the position of the arm can be selectively adjusted with respect to the angular position of the bushing.

Another way of fixing the position of the bushing relative to the hub of the arm is shown in U.S. Pat. No. 2,948,558 to Schultz, which provides a flange on the bushing having teeth around its shoulder which is located adjacent to a bearing surface on which the hub of the arm is rotatable, the arm also having a set of teeth on a surface which lies parallel to the shoulder so that the two annular series of teeth mesh with each other. A washer and nut are provided on the bushing to maintain the two series of teeth tightly locked together except during periods of adjustment. U.S. Pat. No. 2,631,472 to MacDougall shows a similar structure using interlocking teeth to maintain the adjusted position of the bushing with respect to the hub of the arm.

U.S. Pat. No. 2,648,996 to MacDougall shows intermeshing ratchet teeth maintaining the adjusted position of the bushing with respect to the hub of the arm, and in this patent the mesh of the teeth is yieldably maintained by spring means. U.S. Pat. No. 2,697,497 to Shively shows a similar structure in which the engagement between the teeth is spring loaded. These are both automatic slack adjusters.

Copies of the above four patents are filed with the specification in lieu of a prior art statement.

THE INVENTION

The present invention is directed to an improvement in the type of slack adjuster assembly generally shown in the above mentioned patents and comprising a bushing member which is splined onto the brake shaft, the bushing member having an annular flange adjacent to an outer annular bearing surface and separated therefrom by an outwardly extending shoulder having an annular series of teeth. The slack adjuster assembly further includes a lever arm which is connected to the power actuator and has a hub member which surrounds the bearing surface of the bushing member and is journaled thereon, the hub member also having an outwardly disposed shoulder lying opposite the annular shoulder of the flange and also having an annular series of teeth which can interengage with the teeth on the flange shoulder when the hub member is located axially along the bearing surface of the bushing so that the two sets of teeth mesh. The present invention includes spring means yieldably urging the hub member toward the shoulder of the bushing member so as to keep the teeth normally engaged. The improvement comprises adjustment means including a pawl which is located in a recess in one of the shoulders and faces toward the other shoulder. An adjustment shaft supports the pawl and is used to rotate the pawl in the recess of one shoulder so that lug means on the pawl will be brought into contact with the teeth on the opposing shoulder, thereby moving the hub member of the lever away from the flange of the bushing member and separating the teeth by compressing the spring means, while at the same time advancing the engagement of the teeth by one tooth in whichever direction the adjustment shaft is being rotated. In one angular position the diameter of the pawl itself is less than sufficient to permit the pawl to contact the teeth on the other opposing shoulder, but the lug extends sufficiently from the pawl so that when the pawl is rotated it will contact the opposing teeth, entering between two adjacent teeth and advancing the engagement between the opposing series of teeth as the pawl is further rotated. The adjustment shaft which supports the pawl has a head which extends outwardly for access, and the head is shaped to facilitate gripping thereof for the purpose of rotating the shaft when a workmen with an appropriate tool is adjusting the vehicle brakes.

OBJECTS AND ADVANTAGES OF THE INVENTION

It is a principle object of the invention to provide a manually adjustable slack adjuster of the type set forth above, wherein adjustment can be made through discrete small steps which steps are apparent in a positive way to the mechanic making the adjustment so that he can tell precisely how many steps he has moved the adjustment through. The type of slack adjuster which uses a worm and worm wheel arrangement is in common use, but it suffers from the disadvantage that vibration tends to cause the worm to creep so that the adjustment can slip in response to such vibration and is not fully reliable. Various positive locking adjustments have been provided in the prior art, but these positive locking adjustments tend to be difficult to change, and may lead to less frequent adjustment of the brakes of a vehicle than is desirable for safety sake. There are a number of automatic slack adjusting braking systems which show means designed to tighten the adjustment to remove the slack whenever the slack reaches a certain degree. However, these adjusters suffer from a tendency to over-tighten the brakes, such over-tightening causing locking of a wheel with accompanying ruining of the tire as well as the possibility of fire, especially on tandem wheeled vehicles when travelling the highways in unloaded condition so that failure of a wheel to rotate is not noticeable to the driver.

It is therefore the object of this invention to provide a noncreeping slack adjuster which is at the same time very easy to adjust without requiring disassembly, and wherein the adjustments occur in equal small increments achieved by multiple manipulative steps which are easily distinguished and counted.

It is another important object of the invention to provide a slack adjuster wherein the adjustment is made by rotating an adjustment shaft, wherein the shaft must be rotated through a large angular motion in order to achieve one small increment or step in the mutual engagement between the opposing series of teeth so that the adjustment occurs slowly and the increments of adjustment are easily distinguished from each other by the mechanic.

Still another object of the invention is to provide a slack adjuster wherein rotation of the adjustment shaft causes separation of the two series of interengaging teeth, and at the same time causes the advancement by one tooth of the mutual engagement, the direction of advancement being determined by the direction of rotation of the adjustment shaft by the mechanic.

Still another object of the invention is to provide a slack adjuster wherein release of the adjustment shaft after advancement of the tooth engagement in either direction leaves the adjuster in fully operational condition, requiring no retightening of parts previously loosened for the purpose of adjustment, as would be necessary in some of the prior art disclosures, for instance as shown in the previously mentioned U.S. Pat. Nos. 2,948,558 and 2,631,472. As a result, there is no possibility of a careless mechanic leaving the slack adjuster in partially assembled, and therefore hazardous condition.

Still another object of the invention is to provide a slack adjuster in which the engagement between the various moving parts of the adjuster assembly are fully sealed by O-rings, whereby dust and salt can be excluded from the slack adjuster parts, while at the same time a suitable grease can be retained therein in order to prevent corrosion of the parts.

Still a further object of the invention is to provide a slack adjuster wherein adjustment is dependably maintained by careful selection of the angle of the teeth where they mutually engage, the spring means merely keeping the parts mutually engaged, but not being heavily loaded to maintain the nonslip engagement.

A further object of the invention is to provide a slack adjuster in which the adjustment is made by rotating a pawl which separates opposing series of teeth while advancing their engagement by one tooth, the pawl being shaped like a cam and having lug means which cause separation of the two series of teeth, a lug entering between adjacent teeth in the opposing series and advancing the teeth during further rotation of the pawl. Yet another corollary object is to provide a pawl having two cam lobes, each having a tooth-engaging lug, and the lugs being so shaped that one lug is operative only when the pawl is rotated clockwise, and the other lug is operative only when the pawl is rotated counterclockwise.

Other objects and advantages of the invention will become apparent during the following discussion of the drawings.

THE DRAWINGS

PREFERRED EMBODIMENT

Figure 1:
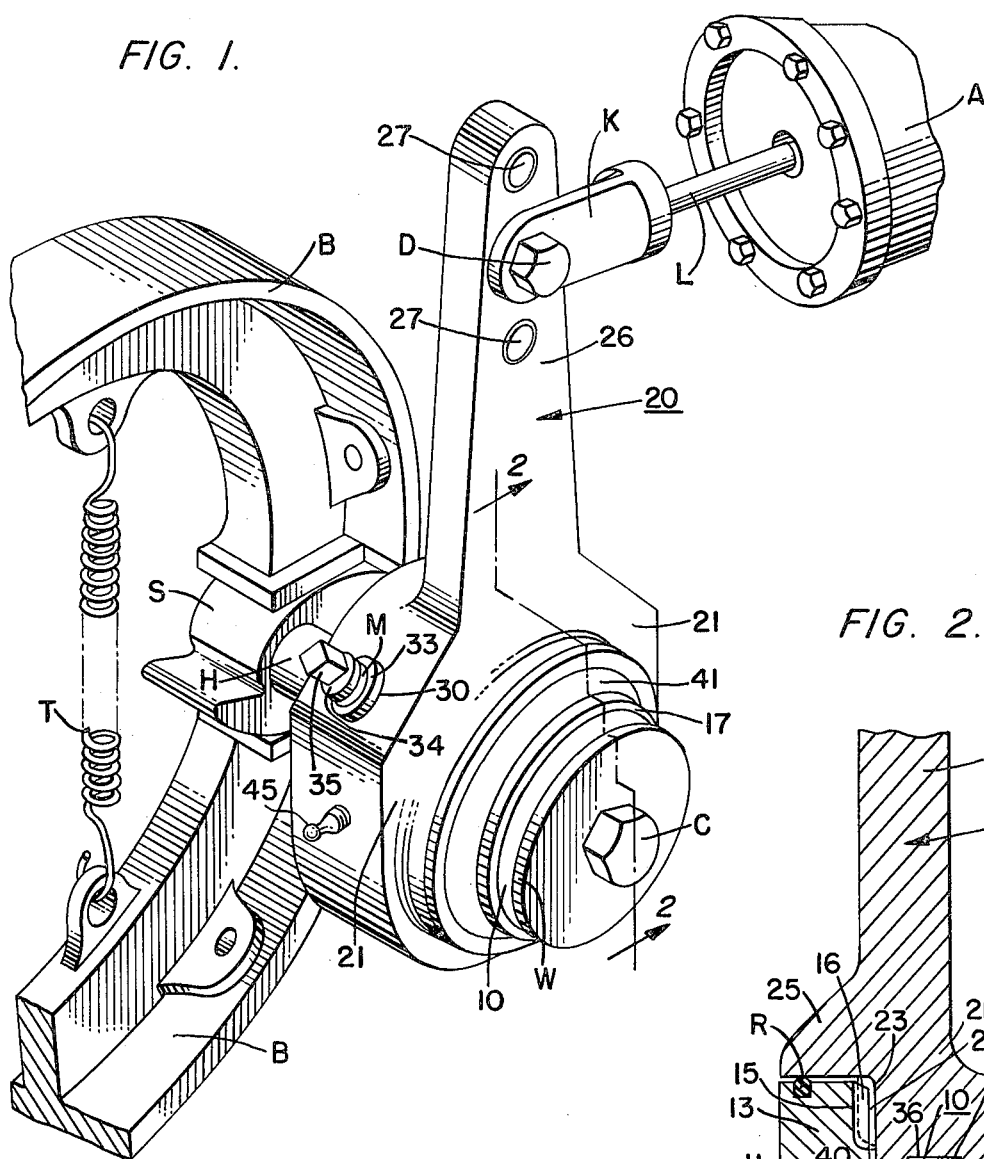
FIG. 1 is a perspective view showing a part of a vehicle brake assembly and a brake actuator coupled together by a slack adjusting assembly according to the present invention.

Referring now to the figures of the drawing, FIG. 1 shows in perspective a portion of a typical vehicle drum brake including a pair of brake shoes B which are urged together by a tension spring T so as to keep them normally spaced away from a brake drum (not shown). The brake shoes are in contact with a cam S which is carried by a brake shaft H, rotation of the shaft H and the cam S moving the brake shoes B further apart against the tension of the spring T to set the brakes against the drum. An actuator A comprises a pneumatic cylinder having a piston or diaphragm (not shown) connected to a rod L carrying a connecting member K at its outer end. The slack adjuster assembly is mounted on the brake shaft H, the outer end of which is splined as at P, the splines being visible in FIGS. 2 and 4. The outer end of the brake shaft H is threaded as at F and receives a bolt C which passes through a washer W for the purpose hereinafter explained. These parts are standard in vehicle assemblies and are not considered to be part of the present invention, per se.

Figure 2:
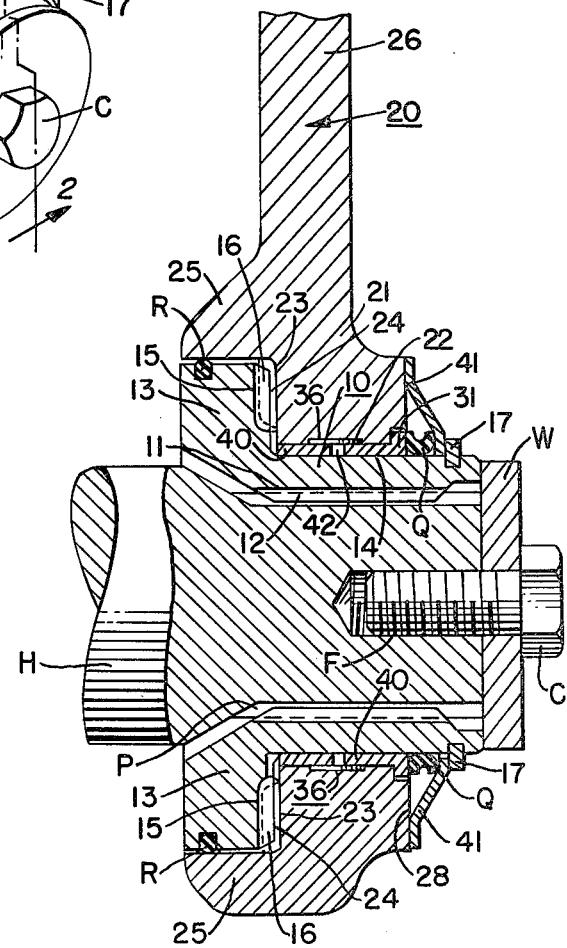
FIG. 2 is a fragmentary sectional view taken along line 2—2 of FIG. 1.
Figure 4:
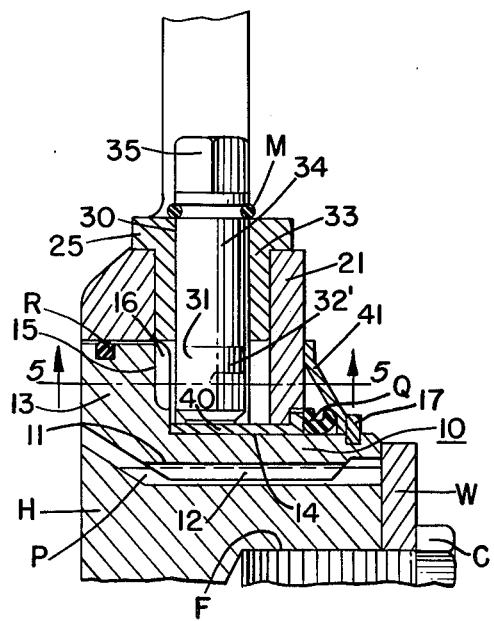
FIG. 4 is a partial sectional view taken along line 4—4 of FIG. 3.

The slack adjuster assembly which forms the subject matter of the present invention is mounted on the shaft H and comprises a bushing member 10 which can be seen best in FIGS. 2 and 4. The bushing member has a central bore 11 extending therethrough, and the bore is splined as shown at 12 so that the bushing fits onto the brake shaft H and keyed nonrotatively by the splines 12 and P, and is held thereon by the washer W secured in place by the bolt C.

The bushing member 10 carries an annular flange 13 which is located adjacent to a bearing surface 14 and is separated therefrom by an outwardly extended shoulder 15 which supports an annular series of teeth 16. The teeth 16 can also be seen in FIG. 5, and extend substantially radially outwardly from the axis of the brake shaft. The slack adjuster assembly further includes a lever 20 which has a central hub member 21 having a bore 22 extending therethrough and serving to journal the hub member 21 on the bearing surface 14 of the bushing member 10. A sleeve bearing insert 40 can be seen in FIGS. 2 and 4, and facilitates both rotational and longitudinal motion between the hub member 21 and the bearing surface 14 of the bushing member 10. The hub member 20 also includes an annular shoulder 23 which is located opposite the shoulder 15 of the flange 13 of the bushing member 10, the shoulder 23 having an annular series of teeth 24 as can be seen in FIGS. 2 and 5 of the drawing.

The hub member 21 further includes an axially extending portion 25 which lies opposite the outer periphery of the flange 13 and is sealed thereto by a suitable O-ring R which is visible in FIGS. 2 and 4. The lever includes an arm 26 having holes 27 near its upper end which are used for selective connection to the connector K by means of a bolt D, all in a manner well-known per se in the art. The hub member has a face 28 which faces away from the shoulder 23, and a spring washer 41 is compressed against the face 28 by a C-clip 17 entered in a suitable annular groove in the righthand end of the bearing surface 14 as can be seen in FIGS. 2 and 4. A suitable seal Q is inserted under the spring washer 41 for the purpose of excluding dust and retaining lubricant in the hub member 21 in the manner to be hereinafter described.

Figure 3:
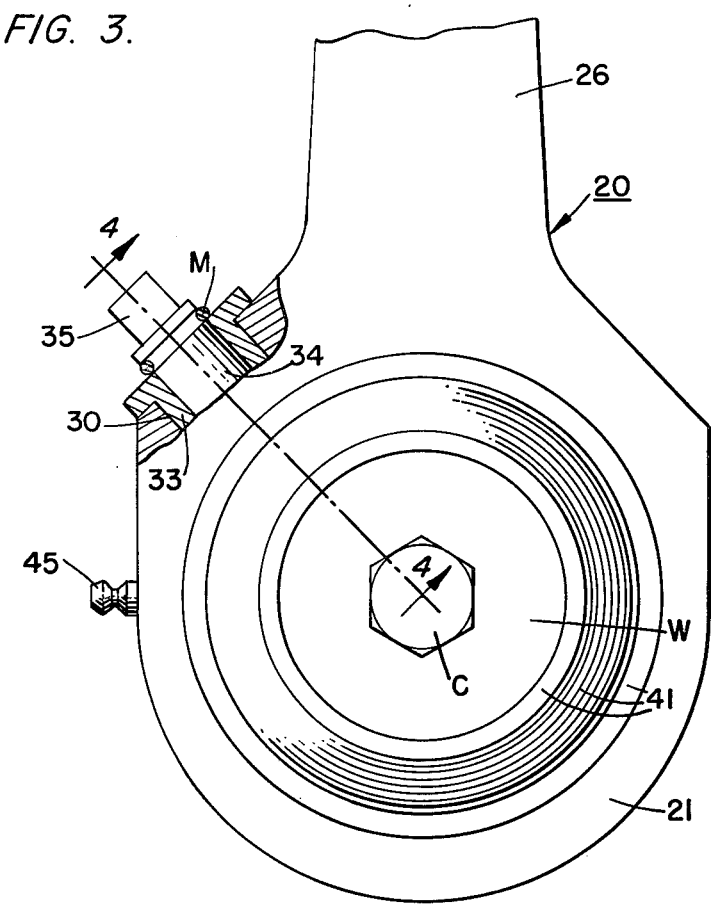
FIG. 3 is a partial elevation view of the slack adjuster according to the present invention looking along the axis of the brake shaft.
Figure 5:
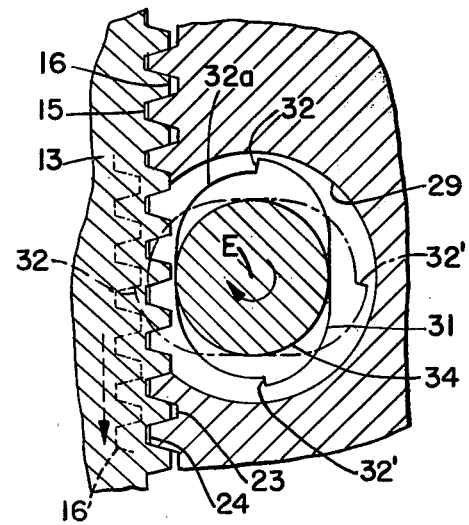
FIG. 5 is an enlarged fragmentary section view taken along line 5—5 of FIG. 4.

The hub member 21 further includes a recess 29 as can be seen in FIG. 5, this recess being joined by a bore 30 extending radially outwardly through the hub member as can be seen in FIGS. 1, 3 and 4. The bore 30 houses a bearing sleeve 33 which supports an adjustment shaft 34 having wrench head flats 35 at its outer end, the shaft 34 being sealed with respect to the bearing sleeve 33 by an O-ring 34.

The adjustment shaft 34 extends into the recess 29 of the hub 21 and carries at its inner end a pawl 31 having lug means 32 and 32' at spaced intervals around its periphery. The pawl is narrower from its center E out to its periphery in the areas away from the lug means 32 and 32', but is like a cam in that it becomes wider at 32a as it approaches a lug 32, whereby to engage the teeth 16 on the flange 13 and separate them from the teeth 24 and move them into the position shown in a dashed line in FIG. 5. This operation will be further discussed hereinafter.

A Zerk fitting 45 is fixed to the hub member 21 and communicates through a passage (not shown) with an annular grease groove 36, FIG. 2, extending around the inner periphery of the hub 21 and delivering grease to the bearing insert 40, some of which grease passes through the hole 42 and lubricates the inner surface of the bearing insert 40 against the bearing surface 14 of the bushing member 10.

The operation of the slack adjuster assembly is as follows. Assuming that the slack adjuster assembly is connected as shown in FIG. 1 between the actuator A and the shaft H of the brake, during normal operation of the brake the spring washer 41 will yieldably maintain the teeth 16 in full engagement with the teeth 24 as shown in solid lines in FIG. 5, the angles of the sides of the teeth 16 and 24 being selected according to well-known engineering practices so that torque applied to the arm 26 of the lever member 20 will not cause the teeth 16 and 24 to ride up upon each other and slip their engagement to another position.

When it is desired to adjust the brakes so as to take slack out of them and thereby cause the actuator A to apply the brakes using a shorter rightward motion of its connecting rod L, it will be necessary to rotate the shaft H and the cam S in the direction of the arrow drawn on the cam in FIG. 1, assuming that the position of the arm 20 is not moved during this adjustment. For this purpose, the teeth 16 should be moving downwardly in FIG. 5 as shown by the dashed-line arrow, and this can be accomplished by rotating the adjustment shaft 34 counterclockwise in the direction shown in FIG. 5 so as to bring the lug 32 downwardly to the position shown in dashed lines, which motion will at the same time move the lug 32' upwardly to the position shown in dashed lines on the righthand side of FIG. 5. It should be noted that the radius of the pawl as measured in a position 90° displaced from either lug 32 is less than the distance from the center of E of the adjustment shaft 34 to the root of the nearest tooth 24, but that the radius of the pawl at 32a plus its lug means 32 is greater than the distance from the center E of the adjustment shaft 34 to the outermost tip of the nearest tooth 24, whereby the lug 32 will engage one of the teeth 16 and push them completely out of engagement with the teeth 24, at the same time moving the teeth 16 downwardly as shown in dashed lines in FIG. 5 as the adjustment shaft 34 is rotated counterclockwise.

Conversely, if the adjustment shaft is rotated clockwise, the lug 32' rises to the left, and will move the teeth 16 upwardly, rather than downwardly, thereby loosening the adjustment on the brake by leaving the cam S with a greater required rotation before the brake shoes B will be spread outwardly sufficiently to contact the brake drum. A suitable wrench applied to the flats of the head 35 of the adjustment shaft 34 can be rotated in either direction so as to either tighten or loosen the brakes, no further manipulation of any part of the slack adjuster assembly being necessary. Thus, as soon as the tool is removed from the flats 35 with the cam located substantially in the position shown in full lines in FIG. 5, the brakes are in fully operational condition and require no subsequent reassembly or tightening of parts. It should be further apparent that even if a careless workmen leaves the adjustment shaft 34 in a position in which one of the lugs 32 is pushing the teeth 16 in a direction to separate them from the teeth 24, the mechanism will slip only one engagement before automatically returning the pawl 31 substantially to the position shown in FIG. 5 in full lines. Thus, the assembly is protected against careless adjustment by a workmen leaving a lug 32 engaged with the teeth 16.

This invention is not be limited to the exact form shown in the drawings, for obviously changes can be made within the scope of the following claims. For example, the adjustment shaft 34 and pawl 31 could be carried by a suitably modified bushing member 10 instead of being carried by the arm member 20, if such structure were desired in a particular application.

I claim:

1. A slack adjuster assembly for coupling a brake shaft to a power actuator to achieve rotation of the brake shaft about its axis when the actuator is moved, comprising:
  (a) a bushing member surrounding the shaft and fixed thereto, the bushing member having an annular flange therearound and having a bearing surface around the bushing member and located adjacent to the flange which extends outwardly from the bearing surface at an annular shoulder;
  (b) a lever having a hub member surrounding the bearing surface of the bushing member and journaled thereon, and the hub member having an annular shoulder disposed opposite to the annular shoulder of the bushing member, and the lever having an arm extending from its hub member and coupled to said actuator;
  (c) an annular series of teeth carried by each of said shoulders, the respective series of teeth manually engaging when the hub member is displaced axially along the bearing portion so that said shoulders approach each other;
  (d) spring means carried by the members and yieldable urging the hub member toward the bushing shoulder to maintain said series of teeth normally engaged;
  (e) the shoulder of one of said members having a recess therein and having a bore extending from the recess outwardly of the member; and
  (f) a pawl in the recess and having an adjustment shaft extending outwardly through said bore and operative to rotate the pawl in the recess; and the pawl having lug means engageable with a tooth of the series carried by the other of said members and operative when the pawl is rotated to force the shoulders apart against the spring means and to annularly shift said mutual engagement by one tooth.

2. The assembly as claimed in claim 1, wherein said shoulders extend radially of said axis, and said bore extends radially into the hub member and into said recess, and said pawl being rotatable to bring said lug means into engagement with a tooth carried by the flange of the bushing member, continued rotation of the pawl displacing the hub member away from the shoulder of the bushing member.

3. The assembly as claimed in claim 2, wherein the radius of the pawl between lug means is less than the distance from the center of the adjustment shaft to the root of the nearest tooth carried on the hub member, and the radius of the pawl plus its lug means is greater than the distance from the center of the adjustment shaft to the tip of the same tooth.

4. The assembly as claimed in claim 1, wherein the spring means comprises a spring washer surrounding the bushing member on the other side of the hub member from the flange; and means for axially compressing the washer against the hub member to yieldably urge it toward the shoulder on the flange.

5. The assembly as claimed in claim 1, wherein said adjustment shaft extends from said bore beyond said one member and terminates in a head gripable to rotate the adjustment shaft and pawl.

6. The assembly as claimed in claim 1, further including annular seal means disposed between the hub member and said bearing surface on one side of the teeth, and between the hub member and the flange on the other side of the teeth.

7. The assembly as claimed in claim 1, wherein said brake shaft is splined and said bushing member has a central opening splined to fit the brake shaft, and means for maintaining the bushing member on the shaft.

8. The assembly as claimed in claim 1, further including seal means disposed between said adjustment shaft and the bore of the member supporting it.

* * * * *